(12) United States Patent
Kamei

(10) Patent No.: US 11,089,778 B2
(45) Date of Patent: Aug. 17, 2021

(54) EFFICACY-ENHANCING AGENT COMPOSITION FOR AGROCHEMICALS

(71) Applicant: KAO CORPORATION, Tokyo (JP)

(72) Inventor: Masatoshi Kamei, Wakayama (JP)

(73) Assignee: KAO CORPORATION, Tokyo (JP)

( * ) Notice: Subject to any disclaimer, the term of this patent is extended or adjusted under 35 U.S.C. 154(b) by 454 days.

(21) Appl. No.: 16/062,749

(22) PCT Filed: Dec. 15, 2016

(86) PCT No.: PCT/JP2016/087335
§ 371 (c)(1),
(2) Date: Jun. 15, 2018

(87) PCT Pub. No.: WO2017/104733
PCT Pub. Date: Jun. 22, 2017

(65) Prior Publication Data
US 2018/0368398 A1    Dec. 27, 2018

(30) Foreign Application Priority Data

Dec. 16, 2015    (JP) .............................. JP2015-245087

(51) Int. Cl.
| A01N 25/30 | (2006.01) |
| A01N 25/04 | (2006.01) |
| A01N 25/24 | (2006.01) |
| A01N 57/28 | (2006.01) |

(52) U.S. Cl.
CPC .............. *A01N 25/30* (2013.01); *A01N 25/04* (2013.01); *A01N 25/24* (2013.01); *A01N 57/28* (2013.01)

(58) Field of Classification Search
CPC ........ A01N 25/30; A01N 25/04; A01N 25/24; A01N 57/28; A01N 2300/00
See application file for complete search history.

(56) References Cited

U.S. PATENT DOCUMENTS

| 5,863,909 | A | 1/1999 | Kurita et al. | |
| 2001/0029240 | A1* | 10/2001 | Hasebe .................. | A01N 33/08 504/334 |
| 2010/0160168 | A1* | 6/2010 | Lindner ................. | A01N 25/02 504/362 |
| 2012/0015813 | A1* | 1/2012 | Nomura ................. | A01N 25/04 504/362 |
| 2013/0116121 | A1* | 5/2013 | Nomura ................. | A01N 43/16 504/140 |
| 2013/0196854 | A1 | 8/2013 | Kamei et al. | |
| 2013/0203599 | A1* | 8/2013 | Inoue ..................... | A01N 25/30 504/206 |
| 2015/0141249 | A1* | 5/2015 | Anderson ............ | A01N 43/653 504/105 |
| 2015/0148425 | A1 | 5/2015 | Fuls et al. | |

FOREIGN PATENT DOCUMENTS

| CN | 1173110 A | 2/1998 |
| CN | 101684435 A | 3/2010 |
| CN | 102355818 A | 2/2012 |
| CN | 104012575 A | 9/2014 |
| JP | 57-163303 A | 10/1982 |
| JP | 9-202801 A | 8/1997 |
| JP | 10-158302 A | 6/1998 |
| JP | 2009-148682 A | 7/2009 |
| JP | 2010-235455 A | 10/2010 |
| JP | 2011-207828 A | 10/2011 |
| WO | WO 2012/029893 A1 | 3/2012 |

OTHER PUBLICATIONS

Chinese Office Action and Search Report for corresponding Chinese Application No. 201680061347.4, dated Jul. 10, 2020, with an English translation of the Office Action.
International Preliminary Report on Patentability and English translation of the Written Opinion of the International Searching Authority (forms PCT/IB/373 and PCT/ISA/237), dated Jun. 19, 2018, for International Application No. PCT/JP2016/087335.
International Search Report (PCT/ISA/210) issued in PCT/JP2016/087335, dated Feb. 28, 2017.

* cited by examiner

*Primary Examiner* — Monica A Shin
(74) *Attorney, Agent, or Firm* — Birch, Stewart, Kolasch & Birch, LLP

(57) ABSTRACT

The present invention is an efficacy-enhancing agent composition for agrochemicals, including water and the following components A, B and C:
<component A> one or more cellulose derivatives selected from hydroxypropylcellulose and hydroxypropylmethylcellulose,
<component B> one or more compounds selected from a sulfate, a phosphate, a nitrate, sucrose, glucose, fructose, sorbitol, and glycerin, and
<component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms,
wherein a mass ratio of component B to component C, component B/component C, is 5 or more and 100 or less.

8 Claims, 1 Drawing Sheet

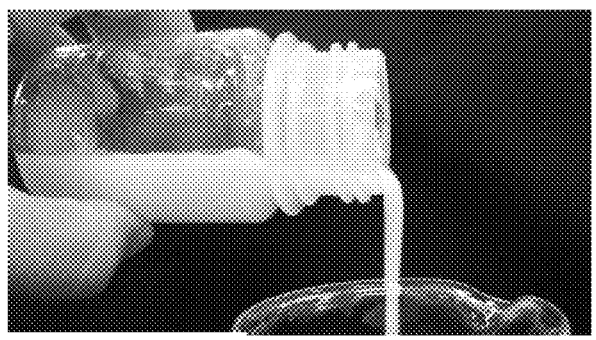
Example 1-3
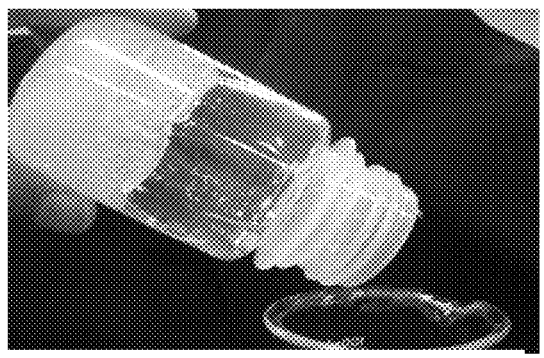
Comparative Example 1-1

EFFICACY-ENHANCING AGENT COMPOSITION FOR AGROCHEMICALS

FIELD OF THE INVENTION

The present invention relates to an efficacy-enhancing agent composition for agrochemicals, an agrochemical composition, and an insecticide composition.

BACKGROUND OF THE INVENTION

In view of physical properties of formulations, various means are contrived for agrochemicals typified by insecticides, bactericides, herbicides, miticides, and plant growth regulators in order to bring out their effects sufficiently, and thus agrochemicals are used in the form of an emulsifiable concentrate, a wettable powder, granules, dust, a flowable liquid, a liquid concentrate, or the like. On the other hand, in order to sufficiently bring out, enhance, and maintain the efficacy of agrochemicals, spreaders for improving adhesiveness, wettability, penetrability, and sticking properties of agrochemicals are used. As agrochemicals and spreaders for enhancing the efficacy of agrochemicals, those in the form of a liquid, such as an emulsifiable concentrate, a flowable liquid, or a liquid concentrate, which are easy to measure, are favorably used in view of operability. Furthermore, formulations free from organic solvents are recently desired with environmental consideration.

As means for sufficiently bring out the effect of agrochemicals and enhancing their efficacy, the techniques of increasing the amount adhered to plants are especially effective. The efficacy of agrochemicals can persist for long period through sticking techniques for preventing agrochemicals from running off from the surface of leaves or the like due to rain or the like.

As techniques for improving adhesiveness or sticking properties of agrochemicals to plants, cellulose derivatives are used. For example, JP-A $_{2011-207828}$ discloses an agricultural spreader containing one or more cellulose derivatives selected from a water soluble hydroxypropylcellulose and a water soluble hydroxypropylmethylcellulose, a surfactant such as a polyoxyalkylene alkyl ether, and water. Further, JP-A 2010-235455 discloses an agrochemical-containing composition containing hydroxypropylcellulose, an agrochemical, an organic solvent having a saturated vapor pressure at 25° C. of 50 mmHg or more, and water, wherein the content of the organic solvent is 0.02 to 1% by weight based on 100% by weight of the whole of the composition and the weight ratio of hydroxypropylcellulose to the organic solvent, hydroxypropylcellulose/organic solvent, is 0.1 to 2.

SUMMARY OF THE INVENTION

However, cellulose derivatives, which enhance efficacy of agrochemicals, are difficult to dissolve in a solvent or water and also have a poor dispersibility in these liquids. Therefore, cellulose derivatives tend to form lumps of powder, and swelling polymers thereof also tend to aggregate or become gelling state. Thus, it has been found that it is very difficult to maintain a stable liquid state when preparing an efficacy-enhancing agent composition for agrochemicals using a cellulose derivative.

The present invention provides an efficacy-enhancing agent composition for agrochemicals having an excellent effect of enhancing efficacy of agrochemicals and also excellent storage stability, and an agrochemical composition using the same.

The present invention also provides an insecticide composition having an excellent insecticidal efficacy and storage stability.

The present invention relates to an efficacy-enhancing agent composition for agrochemicals, including water and the following components A, B and C:

<component A> one or more cellulose derivatives selected from hydroxypropyicellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein a mass ratio of component B to component C, component B/component C, is 5 or more and 100 or less.

The present invention also relates to an agrochemical composition including the efficacy-enhancing agent composition for agrochemicals of the present invention and an agrochemical active ingredient.

The present invention also relates to an insecticide composition including water and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein a mass ratio of component B to component C, component B/component C, is 5 or more and 100 or less.

According to the present invention, there is provided an efficacy-enhancing agent composition for agrochemicals having an excellent effect of enhancing efficacy of agrochemicals and also excellent storage stability, and an agrochemical composition using the same.

According to the present invention, there is also provided an insecticide composition having an excellent insecticidal efficacy and storage stability.

BRIEF DESCRIPTION OF DRAWINGS

FIG. 1 shows photographs illustrating the state of the efficacy-enhancing agent composition for agrochemicals of Example and Comparative Example, respectively.

EMBODIMENTS OF THE INVENTION

[Efficacy-Enhancing Agent Composition for Agrochemicals]

Cellulose derivatives of component A are easy to aggregate, gelate, and form lumps of powder in water, and thus it is difficult to produce a liquid formulation with high concentration of any of them.

In the present invention, it is considered that because of incorporating a specific compound of component B and also incorporating a specific surfactant of component C, the crystals of the cellulose derivative of component A do not aggregate and can maintain a dispersed state in water, and that as a result, the effect of enhancing efficacy of agrochemicals and storage stability is significantly improved.

<Component A>

Component A is one or more cellulose derivatives selected from hydroxypropylcellulose and hydroxypropylmethylcellulose.

Hydroxypropylcellulose and hydroxypropylmethylcellulose are each preferably water-soluble. The term "water-soluble" for component A means having solubility to water at 20° C. of 100 mg/L or more. The solubility of component A to water can be controlled by adjusting the degree of substitution with hydroxypropoxyl groups and methoxyl groups within a preferable range mentioned hereinafter or adjusting the viscosity of an aqueous solution of the cellulose derivative within a preferable range mentioned hereinafter.

In the present invention, by using the cellulose derivative of component A, an effect of the cellulose derivative in the present invention (the effect of improving adhesiveness of an active ingredient to plants) can be sufficiently exhibited.

In view of improving adhesiveness of an active ingredient to plants, component A preferably provides a viscosity of a 2 mass % aqueous solution of the cellulose derivative at 20° C. (hereinafter also referred to as "2% viscosity") of 50 mPa·s or more and 40000 mPa·s or less as measured with Brookfield viscometer (hereinafter also referred to as "type-B viscometer").

In view of improving adhesiveness of an active ingredient to plants, the 2% viscosity of component A is preferably 100 mPa·s or more, more preferably 400 mPa·s or more, further preferably 1000 mPa·s or more, furthermore preferably 2000 mPa·s or more, furthermore preferably 3000 mPa·s or more, furthermore preferably 4000 mPa·s or more, furthermore preferably 7000 mPa·s or more, furthermore preferably 8000 mPa·s or more. In view of the solubility of component A to water, the 2% viscosity of component A is preferably 38000 mPa·s or less, more preferably 35000 mPa·s or less, further preferably 30000 mPa·s or less, furthermore preferably 20000 mPa·s or less.

The 2% viscosity of component A is specifically measured under the following conditions.

Type-B viscometer: TOKI SANGYO CO., LTD., TVB-10
Temperature: 20° C.
Rotor No.: 21 (or M2)
Number of rotation: 60 rpm In view of adjusting the 2% viscosity within the preferred range mentioned above to improve adhesiveness of an active ingredient to plants, hydroxypropylcellulose has a degree of substitution with hydroxypropoxyl groups of preferably 2.5 or more, more preferably 3.0 or more, and preferably 4.0 or less, more preferably 3.6 or less.

The "degree of substitution with hydroxypropoxyl groups" herein used refers to an average number of hydroxypropoxyl groups introduced per glucose unit, which has three hydroxy groups, of cellulose.

Hydroxypropylcellulose may be produced, for example, according to a known method disclosed in, e.g., JP-A 9-202801, and a commercially available product also may be used. Examples of the commercially available product thereof include HPC series manufactured by NIPPON SODA CO., LTD. and KLUCEL series manufactured by SANSHO Co., Ltd.

In view of adjusting the 2% viscosity within the preferred range mentioned above to improve adhesiveness of an active ingredient to plants, hydroxypropylmethylcellulose has a degree of substitution with methoxyl groups of preferably 1.4 or more, more preferably 1.7 or more, and preferably 2.0 or less, more preferably 1.9 or less.

The "degree of substitution with methoxyl groups" herein used refers to an average number of methoxyl groups introduced per glucose unit, which has three hydroxy groups, of cellulose.

Hydroxypropylmethylcellulose may be produced, for example, according to a known method disclosed in, e.g., JP-A 10-158302, and a commercially available product also may be used. Examples of the commercially available product thereof include Metolose series manufactured by Shin-Etsu Chemical Co., Ltd., NEOVISCO-MC series manufactured by SANSHO Co., Ltd., Mecellose series manufactured by TOMOE Engineering Co., Ltd., Mapolose series manufactured by Matsumoto Yushi-Seiyaku Co., Ltd, and METHOCEL series manufactured by The Dow Chemical Company. Among these commercially available products, examples of those having a 2% viscosity of more than 2000 mPa·s and 40000 mPa·s or less include Metolose 60SH-4000 (4000, 1.9), 60SH-10000 (10000, 1.9), 65SH-4000 (4000, 1.8), 65SH-15000 (15000, 1.8), 90SH-4000 (4000, 1.4), 90SH-15000 (15000, 1.4), and 90SH-30000 (30000, 1.4) manufactured by Shin-Etsu Chemical Co., Ltd., NEOVISCO MC HM-4000 (4000, 1.8), HM-15000 (15000, 1.8), RM-4000 (4000, 1.4), RM-8000 (8000, 1.4), RM-15000 (15000, 1.4), and RM-30000 (30000, 1.4) manufactured by SANSHO Co., Ltd., Mapolose 60MP-4000 (4000, 1.9), 65MP-4000 (4000, 1.8), 90MP4000 (4000, 1.4), 90MP-15000 (15000, 1.4), and 90MP-30000 (30000, 1.4) manufactured by Matsumoto Yushi-Seiyaku Co., Ltd., METHOCEL K4M (4300, 1.4), K15M (16000, 1.4), E4M (4300, 1.9), and E10M (10800, 1.9) manufactured by The Dow Chemical Company. Among these, examples of those further having a degree of substitution with methoxyl groups of 1.7 to 2 include Metolose 60SH-4000, 60SH-10000, 65SH-4000, and 65SH-15000 manufactured by Shin-Etsu Chemical Co., Ltd., NEOVISCO MC HM-4000 and HM-15000 manufactured by SANSHO Co., Ltd., Mapolose 60MP-4000 and 65MP-4000 manufactured by Matsumoto Yushi-Seiyaku Co., Ltd., and METHOCEL E4M and E10M manufactured by The Dow Chemical Company. The values in parentheses for each commercial product above are the 2% viscosity (mPa·s) and the degree of substitution with methoxyl groups, respectively.

In the present invention, as component A, hydroxypropylcellulose and hydroxypropylmethylcellulose mentioned above may be used alone, or hydroxypropylcellulose and hydroxypropylmethylcellulose may be used in combinations thereof. In view of improving adhesiveness of an active ingredient to plants, it is preferable to use hydroxypropylmethylcellulose. Therefore, component A is preferably hydroxypropylmethylcellulose. The efficacy-enhancing agent composition for agrochemicals of the present invention preferably includes hydroxypropylmethylcellulose as component A.

Furthermore, component A is preferably hydroxypropylmethylcellulose providing a 2% viscosity of 50 mPa·s or more, further 400 mPa·s or more, further 2000 mPa·s or more, further 3000 mPa·s or more, further 4000 mPa·s or more, further 5000 mPa·s or more, and further 10000 mPa·s or more; and 40000 mPa·s or less, further 38000 mPa·s or less, further 35000 mPa·s or less, further 33000 mPa·s or less, and further 30000 mPa·s or less.

<Component B>

Component B is one or more compounds selected from a sulfate, a phosphate, a nitrate, sucrose, glucose, fructose, sorbitol, and glycerin.

In view of storage stability of the efficacy-enhancing agent composition for agrochemicals of the present invention and enhancement of efficacy of agrochemicals, the sulfate, the phosphate, and the nitrate are each preferably an inorganic compound.

Examples of the sulfate, the phosphate, and the nitrate each include compounds having an ammonium ion, a potassium ion, a sodium ion, a magnesium ion, or a calcium ion as the counter ion.

Examples of the sulfate include ammonium sulfate, potassium sulfate, sodium sulfate, magnesium sulfate, and calcium sulfate.

Examples of the phosphate include ammonium phosphate, potassium phosphate, sodium phosphate, magnesium phosphate, and calcium phosphate.

Examples of the nitrate include ammonium nitrate, potassium nitrate, sodium nitrate, magnesium nitrate, and calcium nitrate.

In view of storage stability of the efficacy-enhancing agent composition for agrochemicals of the present invention and enhancement of efficacy of agrochemicals, component B is preferably one or more compounds selected from ammonium sulfate, dipotassium hydrogen phosphate, sodium nitrate, glucose, sucrose, fructose, sorbitol, and glycerin, more preferably one or more compounds selected from ammonium sulfate, dipotassium hydrogen phosphate, sodium nitrate, and glucose, and further preferably ammonium sulfate.

<Component C>

Component C is one or more surfactants selected from an alkylbenzene sulfonate having an alkyl group with 12 or more and 16 or less carbon atoms and an alkyldimethylamine oxide having an alkyl group with 12 or more and 16 or less carbon atoms.

In view of storage stability of the efficacy-enhancing agent composition for agrochemicals of the present invention and enhancement of efficacy of agrochemicals, the number of carbon atoms of the alkyl group of the alkylbenzene sulfonate is preferably 12 or more and 14 or less. In view of storage stability of the efficacy-enhancing agent composition for agrochemicals of the present invention and enhancement of efficacy of agrochemicals, the alkylbenzene sulfonate is preferably an alkali metal salt, preferably a sodium salt or a potassium salt, and more preferably a sodium salt.

In view of storage stability of the efficacy-enhancing agent composition for agrochemicals of the present invention and enhancement of efficacy of agrochemicals, the number of carbon atoms of the alkyl group of the alkyldimethylamine oxide is preferably 12 or more and 14 or less.

In view of storage stability of the efficacy-enhancing agent composition for agrochemicals of the present invention and enhancement of efficacy of agrochemicals, component C is preferably one or more surfactants selected from alkylbenzene sulfonates having an alkyl group with 12 or more and 16 or less carbon atoms.

<Water>

Tap water, ion exchanged water, or the like can be used as water.

<Composition, Optional Components, and Others>

The mass ratio of component B to component C, component B/component C, in the efficacy-enhancing agent composition for agrochemicals of the present invention is 5 or more, preferably 7 or more, more preferably 15 or more, and 100 or less, preferably 50 or less, more preferably 35 or less, in view of storage stability of the composition and enhancement of efficacy of agrochemicals.

The efficacy-enhancing agent composition for agrochemicals of the present invention includes component A in an amount of preferably 10 mass % or more, more preferably 12 mass % or more, and further preferably 15 mass % or more, and preferably 30 mass % or less, more preferably 27 mass % or less, and further preferably 25 mass % or less, in view of storage stability of the composition and enhancement of efficacy of agrochemicals.

The efficacy-enhancing agent composition for agrochemicals of the present invention includes component B in an amount of preferably 20 mass % or more, more preferably 25 mass % or more, and further preferably 28 mass % or more, and preferably 50 mass % or less, more preferably 45 mass % or less, and further preferably 35 mass % or less, in view of storage stability of the composition and enhancement of efficacy of agrochemicals.

The efficacy-enhancing agent composition for agrochemicals of the present invention includes component C in an amount of preferably 0.3 mass % or more, more preferably 0.5 mass % or more, and further preferably 0.8 mass % or more, and preferably 5.0 mass % or less, more preferably 4.0 mass % or less, and further preferably 3.0 mass % or less, in view of storage stability of the composition and enhancement of efficacy of agrochemicals.

The efficacy-enhancing agent composition for agrochemicals of the present invention includes water in an amount of preferably 30 mass % or more, more preferably 40 mass % or more, and further preferably 45 mass % or more, and preferably 70 mass % or less, more preferably 60 mass % or less, and further preferably 55 mass % or less, in view of storage stability of the composition and enhancement of efficacy of agrochemicals. The composition can be adjusted by the amount of water. Water is normally used in an amount such that the total amount of water and other components becomes 100 mass %.

The efficacy-enhancing agent composition for agrochemicals of the present invention can have a high concentration of component A and further can be present in the form of a liquid having flowability. As a result, a user of the efficacy-enhancing agent composition for agrochemicals of the present invention can easily mix the composition with a diluent solvent to prepare a spray liquid or the like. The spray liquid has the high concentration of component A, and therefore exhibits the excellent effect of applying to agricultural crops at a high concentration to enhance the effect of agrochemicals.

When the concentration of component A is high, for example, falls within the aforementioned range, component A dissolves hardly and is present in a uniformly dispersed state in the efficacy-enhancing agent composition for agrochemicals of the present invention. Thus, component A can be present in a low viscous state and thus easy to handle in the efficacy-enhancing agent composition for agrochemicals of the present invention. It is considered that the state of component A being dispersed is affected by the mutual quantitative relation between component A and component B. In order to allow component A to be present in dispersed state in the composition, it is preferred to use water to be incorporated into the efficacy-enhancing agent composition for agrochemicals of the present invention preferentially for dissolving (hydrating) component B.

On the other hand, component A easily precipitates in water because the specific gravity thereof is higher than that of water. It is speculated that the quantitative relation between component A, and water as a solvent, component B, and component C is suitable to construct a stably dispersed state of component A when component C is present in a specific mass ratio to component B in the efficacy-enhancing agent composition for agrochemicals of the present invention.

The mass ratio of component A to component B in the efficacy-enhancing agent composition for agrochemicals of the present invention, component A/component B, is preferably 0.2 or more, more preferably 0.3 or more, and further preferably 0.5 or more, and preferably 1.5 or less, more preferably 1.2 or less, and further preferably 0.8 or less, in view of storage stability of the composition and enhancement of efficacy of agrochemicals.

The mass ratio of component A to component C in the efficacy-enhancing agent composition for agrochemicals of the present invention, component A/component C, is preferably 2 or more, more preferably 4 or more, and further preferably 10 or more, and preferably 100 or less, more preferably 60 or less, and further preferably 30 or less, in view of storage stability of the composition and enhancement of efficacy of agrochemicals.

The efficacy-enhancing agent composition for agrochemicals of the present invention may include components other than components A, B, and C. However, the total proportion of components A, B, and C to the total amount of components other than water in the composition is preferably 70 mass % or more, more preferably 80 mass % or more, and further preferably 90 mass % or more, and it is 100 mass % or less, and may be 100 mass %.

The efficacy-enhancing agent composition for agrochemicals of the present invention may include a surfactant other than component C. However, the proportion of component C to the total amount of surfactants is preferably 70 mass % or more, more preferably 80 mass % or more, and further preferably 90 mass % or more, and it is 100 mass % or less, and may be 100 mass %.

The efficacy-enhancing agent composition for agrochemicals of the present invention is a liquid. The efficacy-enhancing agent composition for agrochemicals of the present invention is preferably a dispersion. The efficacy-enhancing agent composition for agrochemicals of the present invention is preferably an aqueous dispersion. The efficacy-enhancing agent composition for agrochemicals of the present invention is preferably a dispersion having component A dispersed in water.

In view of storage stability of the composition and enhancement of efficacy of agrochemicals, the efficacy-enhancing agent composition for agrochemicals of the present invention has a viscosity at 20° C. of preferably 1 mPa·s or more, more preferably 5 mPa·s or more, and further preferably 10 mPa·s or more, and preferably 5000 mPa·s or less, more preferably 2500 mPa·s or less, and further preferably 1000 mPa·s or less, as measured with a type-B viscometer.

The viscosity of the efficacy-enhancing agent composition for agrochemicals herein is specifically measured under the following condition.

Type-B viscometer: TOKI SANGYO CO., LTD., TVB-10
Temperature: 20° C.
Rotor No.: 21 (or M2)
Number of rotation: 60 rpm

[Method for Producing Efficacy-Enhancing Agent Composition for Agrochemicals]

The efficacy-enhancing agent composition for agrochemicals of the present invention can be produced by mixing components A, B, and C and water. Specifically, the present invention provides a method for producing an efficacy-enhancing agent composition for agrochemicals, including mixing components A, B and C and water, wherein components B and C are used such that a mass ratio of component B to component C, component B/component C, is 5 or more and 100 or less.

The present invention provides a method for producing an efficacy-enhancing agent composition for agrochemicals, including mixing water and the following components A, B and C:

<component A> one or more cellulose derivatives selected hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein components B and C are used such that a mass ratio of component B to component C, component B/component C, is 5 or more and 100 or less, and component A is mixed after mixing components B and C and water (hereinafter referred to as production method (I)).

This production method (I) is suitable as a method for producing the efficacy-enhancing agent composition for agrochemicals of the present invention. In other words, production method (I) is suitable as a method for producing an efficacy-enhancing agent composition for agrochemicals having excellent storage stability and also exhibiting an excellent effect of enhancing efficacy of agrochemicals.

In production method (I), it is preferable that the whole amount of component A to be formulated into the efficacy-enhancing agent composition for agrochemicals is mixed after mixing the whole amount of component B, the whole amount of component C, and the whole amount of water to be formulated into the efficacy-enhancing agent composition for agrochemicals.

Production method (I) is preferably conducted as follows: component B is added to water, component C is then added thereto, and component A is then added thereto and mixed.

In production method (I), it is preferable to mix by stirring.

In production method (I), it is preferable to mix at a temperature of 5° C. or more and 50° C. or less.

The same as described for the efficacy-enhancing agent composition for agrochemicals of the present invention also can be applied to production method (I). For example, the contents of respective components in the efficacy-enhancing agent composition for agrochemicals also can be applied to production method (I) as the amounts mixed.

In the method for producing an efficacy-enhancing agent composition for agrochemicals of the present invention, the efficacy-enhancing agent composition for agrochemicals is preferably produced in the form of a dispersion, further in the form of an aqueous dispersion, and further in the form of a dispersion having component A dispersed in water.

[Agrochemical Composition]

The present invention relates to an agrochemical composition including the efficacy-enhancing agent composition for agrochemicals of the present invention stated above and an agrochemical active ingredient.

Specifically, the present invention relates to an agrochemical composition including components A, B, and C, water, and an agrochemical active ingredient, wherein a mass ratio of component B to component C, component B/component C, is 5 or more and 100 or less.

Examples of the agrochemical active ingredient used in the agrochemical composition of the present invention include an active ingredient of any of agrochemical selected from bactericides, insecticides, miticides, and herbicides. The agrochemical active ingredient herein refers to a compound of an active ingredient of an agrochemical.

Examples of the agrochemical active ingredient used in the agrochemical composition of the present invention include, but not limited to, those described in Handbook of Agrochemicals, 2011 (published on Feb. 25, 2011 by the general incorporated association of Japan Plant Protection Association). The efficacy-enhancing agent composition for agrochemicals of the present invention and the agrochemical composition formulating the same can be used safely without any harmful effect on various crops.

Examples of the bactericide include those disclosed in WO2012/029893. In view of the effect of enhancing efficacy by the present invention, the bactericide is preferably basic copper sulfate, organic copper (Oxine-copper), cupric hydroxide, or benomyl (methyl[1-[(butylamino)carbonyl]-1H-benzimidazole-2-yl]carbamate), and more preferably basic copper sulfate or benomyl.

Examples of the insecticide include those disclosed in WO2012/029893. In view of the effect of enhancing efficacy by the present invention, the bactericide is preferably permethrin, DDVP (dimethyl-2,2-dichlorvinyl phosphate), methomyl (S-methyl N-[(methylcarbamoyl)oxy]thioacetimide), or acephate (N-acetylphosphoramidothioic acid O,S-dimethyl ester), and more preferably acephate.

Examples of the miticide include those disclosed in WO2012/029893. In view of the effect of enhancing efficacy by the present invention, the miticide is preferably phenisobromolate (isopropyl 4,4'-dibromobenzylate), amitraz (3-methyl-1,5-bis(2,4-xylyl)-1,3,5-triazapenta-1,4-diene), or Fenpyroximate (tert-butyl=(E)-α-(1,3-dimethyl-5-phenoxypyrazol-4-ylmethylenaminooxy)-p-toluate).

Examples of the herbicide include those disclosed in WO2012/029893. In view of the effect of enhancing efficacy by the present invention, the herbicide is preferably DBN (2,6-dichlorobenzonitrile), DCMU (3-(3,4-dichlorophenyl)-1,1-dimethylurea), paraquat (1,1'-dimethyl-4,4'-bipyridium dichloride), diquat (6,7-dihydrodipyrido[1,2-a:2',1'c]pyrazinedium dibromide), glufosinate (ammonium-DL-homoalanin-4-yl (methyl) phosphinate, glyphosate (N-(phosphonomethyl) glycine or a salt thereof), and more preferable glyphosate. Examples of glyphosate include an isopropylamine salt, an ammonium salt, a potassium salt, a sodium salt, and a trimethium salt, and an isopropylamine salt is preferred.

In view of improving adhesiveness of agrochemicals to plants and enhancement of efficacy of agrochemicals, the mass ratio of the agrochemical active ingredient to component A, the agrochemical active ingredient/component A, in the agrochemical composition of the present invention is preferably 0.2 or more, more preferably 0.5 or more, and further preferably 1 or more, and preferably 80 or less, more preferably 50 or less, and further preferably 20 or less.

Examples of the formulation of the agrochemical composition of the present invention include an emulsifiable concentrate, a liquid concentrate, and a flowable liquid, and these may include any other additives according to the formulations, such as an emulsifier, a solvent, a dispersant, and a carrier. The agrochemical composition of the present invention is preferably a liquid.

In view of the exhibition of the efficacy of the agrochemical active ingredient, the concentration of the agrochemical active ingredient in the agrochemical composition of the present invention is preferably 10 ppm or more, more preferably 100 ppm or more, and further preferably 250 ppm or more, and preferably 20000 ppm or less, more preferably 5000 ppm or less, and further preferably 3000 ppm or less.

In view of preventing drops adhering to plants or noxious insects from falling off to thereby increase the amount adhering thereto for enhancing the efficacy of agrochemicals, the concentration of the efficacy-enhancing agent composition for agrochemicals of the present invention formulated in the agrochemical composition of the present invention is preferably 100 ppm or more, more preferably 500 ppm or more, and further preferably 800 ppm or more, and preferably 10000 ppm or less, more preferably 5000 ppm or less, and further preferably 2000 ppm or less.

In view of enhancing the efficacy of agrochemicals, the concentration of component A formulated in the agrochemical composition of the present invention is preferably 10 ppm or more, more preferably 60 ppm or more, and further preferably 120 ppm or more, and preferably 30000 ppm or less, more preferably 1350 ppm or less, and further preferably 500 ppm or less.

In view of enhancing the efficacy of agrochemicals, the concentration of component B formulated in the agrochemical composition of the present invention is preferably 20 ppm or more, more preferably 125 ppm or more, and further preferably 224 ppm or more, and preferably 5000 ppm or less, more preferably 2250 ppm or less, and further preferably 700 ppm or less.

In view of enhancing the efficacy of agrochemicals, the concentration of component C formulated in the agrochemical composition of the present invention is preferably 0.3 ppm or more, more preferably 2.5 ppm or more, and further preferably 6.4 ppm or more, and preferably 500 ppm or less, more preferably 200 ppm or less, and further preferably 60 ppm or less.

Examples of the method of using the efficacy-enhancing agent composition for agrochemicals of the present invention include a method of using an agrochemical composition of any of the various formulations mentioned above into which the efficacy-enhancing agent composition for agrochemicals has been incorporated, and using the efficacy-enhancing agent composition for agrochemicals when diluting and using an agrochemical (which does not contain the efficacy-enhancing agent composition for agrochemicals of the present invention), and both of them provide the excellent effect of enhancing the efficacy of the agrochemicals, which the present invention aims at. As shown in FIG. 1, the efficacy-enhancing agent composition for agrochemicals of the present invention can be easily poured out from a container by tilting the container, and is thus very easily handled, and therefore, the diluting operation thereof can be easily conducted. When diluting the efficacy-enhancing agent composition for agrochemicals of the present invention with water upon use, component A can be dispersed or dissolved quickly in water to provide a uniform dilution. By using such a dilution, component A and the agrochemical can be adhered to an object uniformly and stably.

Any of a chelating agent, a pH regulator, an inorganic salt, and a thickener may be incorporated into the formulation of the agrochemical composition of the present invention if needed. Those corresponding to component A, component B, or component C are excluded from these optional components.

Because the efficacy-enhancing agent composition for agrochemicals of the present invention can enhance the efficacy of agrochemicals, there is provided a method for enhancing the efficacy of agrochemicals, which includes applying, to an object, an agrochemical active ingredient, specifically, an agrochemical active ingredient selected from, for example, bactericides, insecticides, miticides, and herbicides, together with the efficacy-enhancing agent composition for agrochemicals of the present invention described above.

Because the efficacy-enhancing agent composition for agrochemicals of the present invention can improve rainfastness of agrochemicals, there is provided a method for improving rainfastness of agrochemicals, the method including applying, to an object, an agrochemical active ingredient, specifically, an agrochemical active ingredient selected from, for example, bactericides, insecticides, miticides, and herbicides, together with the efficacy-enhancing agent composition for agrochemicals of the present invention described. The method for enhancing the efficacy of agrochemicals of the present invention mentioned above may be a method for enhancing the efficacy of agrochemicals involving improvement in rainfastness of agrochemicals.

Because the efficacy-enhancing agent composition for agrochemicals of the present invention can improve the sticking properties of agrochemicals, there is provided a method for improving the sticking properties of agrochemicals, which includes applying, to an object, an agrochemical active ingredient, specifically, an agrochemical active ingredient selected from, for example, bactericides, insecticides, miticides, and herbicides, together with the efficacy-enhancing agent composition for agrochemicals of the present invention described above. The method for enhancing the efficacy of agrochemicals of the present invention mentioned above may be a method for enhancing the efficacy of agrochemicals involving improvement in the sticking properties of agrochemicals.

In the present invention, the object of the agrochemical active ingredient is bacteria for bactericides, pest insects (insects) for insecticides, mites for miticides, and weeds (plants that are not crops) for herbicides, and the object may be a plurality of these. The method for enhancing the efficacy of agrochemicals of the present invention can be conducted as a method of applying the agrochemical composition of the present invention to an object selected from weeds, mites, pest insects, and bacteria, for example, as a method of spraying the agrochemical composition on a growing area of crops.

The present invention provides a method for producing an agrochemical composition, which includes mixing an agrochemical active ingredient, components A, B and C, and water, wherein components B and C are used such that a mass ratio of component B to component C, component B/component C, is 5 or more and 100 or less.

The method for producing an agrochemical composition of the present invention preferably includes the steps of: (1) mixing water, component B, and component C in the mass ratio of component B to component C, component B/component C, of 5 or more and 100 or less, followed by mixing the resultant and component A to obtain a mixture, and (2) mixing the mixture and an agrochemical active ingredient. In step (1), it is preferable to obtain the mixture in the form of a dispersion.

The same as described for the efficacy-enhancing agent composition for agrochemicals of the present invention and the agrochemical composition of the present invention can be appropriately applied to the method for producing an agrochemical composition of the present invention.

[Insecticide Composition]

The present invention relates to an insecticide composition including components A, B and C and water, wherein a mass ratio of component B to component C, component B/component C, is 5 or more and 100 or less. The combination of components A, B and C exhibits an insecticide efficacy.

It has been found that the insecticide composition of the present invention exhibits an excellent insecticide efficacy even though it does not contain any other agrochemical active ingredient of an insecticide (active substance of an insecticide). Furthermore, it has also been found that the insecticide composition of the present invention has excellent storage stability.

The same as described for the efficacy-enhancing agent composition for agrochemicals of the present invention can be appropriately applied to the insecticide composition of the present invention.

The insecticide composition of the present invention has a mass ratio of component B to component C, component B/component C, of 5 or more, preferably 7 or more, and more preferably 15 or more, and 100 or less, preferably 50 or less, and more preferably 35 or less, in view of storage stability and the insecticide efficacy of the composition.

The insecticide composition of the present invention includes component A in an amount of preferably 10 mass % or more, more preferably 12 mass % or more, and further preferably 15 mass % or more, and preferably 30 mass % or less, more preferably 27 mass % or less, and further preferably 25 mass % or less, in view of storage stability and the insecticide efficacy of the composition.

The insecticide composition of the present invention includes component B in an amount of preferably 20 mass % or more, more preferably 25 mass % or more, and further preferably 28 mass % or more, and preferably 50 mass % or less, more preferably 45 mass % or less, and further preferably 35 mass % or less, in view of storage stability and the insecticide efficacy of the composition.

The insecticide composition of the present invention includes component C in an amount of preferably 0.3 mass % or more, more preferably 0.5 mass % or more, and further preferably 0.8 mass % or more, and preferably 5.0 mass % or less, more preferably 4.0 mass % or less, and further preferably 3.0 mass % or less, in view of storage stability and the insecticide efficacy of the composition.

The insecticide composition of the present invention includes water in an amount of preferably 30 mass % or more, more preferably 40 mass % or more, and further preferably 45 mass % or more, and preferably 70 mass % or less, more preferably 60 mass % or less, and further preferably 55 mass % or less, in view of storage stability and the insecticide efficacy of the composition. The composition can be adjusted through the amount of water. Water is normally used in an amount such that the total amount of water and other components becomes 100 mass %.

The insecticide composition of the present invention has a mass ratio of component A to component B, component A/component B, of preferably 0.2 or more, more preferably 0.3 or more, and further preferably 0.5 or more, and preferably 1.5 or less, more preferably 1.2 or less, and further preferably 0.8 or less, in view of storage stability and the insecticide efficacy of the composition.

The insecticide composition of the present invention has a mass ratio of component A to component C, component A/component C, of preferably 2 or more, more preferably 4 or more, and further preferably 10 or more, and 100 or less, more preferably 60 or less, and further preferably 30 or less, in view of storage stability and the insecticide efficacy of the composition.

The insecticide composition of the present invention may include components other than components A, B, and C. The total proportion of components A, B, and C to the total amount of components other than water in the composition is preferably 70 mass % or more, more preferably 80 mass % or more, and further preferably 90 mass % or more, and 100 mass % or less, and it may be 100 mass %.

The insecticide composition of the present invention is a liquid.

In view of storage stability and the insecticide efficacy of the composition, the insecticide composition of the present invention has a viscosity at 20° C. of preferably 1 mPa·s or more, more preferably 5 mPa·s or more, and further preferably 10 mPa·s or more, and preferably 5000 mPa·s or less, more preferably 2500 mPa·s or less, and further preferably 1000 mPa·s or less, as measured with a type-B viscometer. The viscosity of the insecticide composition is specifically measured under the same conditions as for the aforementioned viscosity of the efficacy-enhancing agent composition for agrochemicals.

The insecticide composition of the present invention can be produced by mixing components A, B, and C and water. In other words, the present invention provides a method for producing an insecticide composition, the method including the step of mixing components A, B, and C and water, wherein components B and C are used such that a mass ratio of component B to component C, component B/component C, is 5 or more and 100 or less.

The present invention provides a method for producing an insecticide composition, which includes mixing water and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein components B and C are used such that a mass ratio of component B to component C, component B/component C, is 5 or more and 100 or less, and component A is mixed after mixing components B and C and water (hereinafter referred to as production method (I')).

This production method (I') is suitable as a method for producing the insecticide composition of the present invention. In other words, production method (I') is suitable as a method for producing an insecticide composition having excellent storage stability and also the excellent insecticide efficacy.

In production method (I'), it is preferable that the whole amount of component A to be formulated into the insecticide composition is mixed after mixing the whole amount of component B, the whole amount of component C, and the whole amount of water to be formulated into the insecticide composition.

Production method (I') is preferably conducted as follows: component B is added to water, component C is then added thereto, and component A is then added thereto and mixed.

In production method (I'), it is preferable to mix by stirring.

In production method (I'), it is preferable to mix at a temperature of 5° C. or more and 50° C. or less.

The same as described for the insecticide composition of the present invention also can be applied to production method (I'). For example, the contents of respective components in the insecticide composition also can be applied to production method (I') as the amounts mixed.

In the method for producing an insecticide composition of the present invention, the insecticide composition is preferably produced in the form of a dispersion, further preferably in the form of an aqueous dispersion, further preferably in the form of a dispersion having component A dispersed in water.

The insecticide composition of the present invention can be applied to an object as a treatment liquid diluted with water in the same manner as for a general insecticide.

In view of preventing drops adhering to plants or noxious insects from falling off to thereby increase the amount adhering thereto and also in view of providing the insecticide efficacy, the concentration of the insecticide composition of the present invention formulated in the treatment liquid is preferably 100 ppm or more, more preferably 500 ppm or more, and further preferably 800 ppm or more, and preferably 10000 ppm or less, more preferably 5000 ppm or less, and further preferably 2000 ppm or less.

In view of providing the insecticide efficacy, the concentration of component A formulated in the treatment liquid is preferably 10 ppm or more, more preferably 60 ppm or more, and further preferably 120 ppm or more, and preferably 3000 ppm or less, more preferably 1350 ppm or less, and further preferably 500 ppm or less.

In view of providing the insecticide efficacy, the concentration of component B formulated in the treatment liquid is preferably 20 ppm or more, more preferably 125 ppm or more, and further preferably 224 ppm or more, and preferably 5000 ppm or less, more preferably 2250 ppm or less, and further preferably 700 ppm or less.

In view of providing the insecticide efficacy, the concentration of component C formulated in the treatment liquid is preferably 0.3 ppm or more, more preferably 2.5 ppm or more, and further preferably 6.4 ppm or more, and preferably 500 ppm or less, more preferably 200 ppm or less, and further preferably 60 ppm or less.

OTHER EMBODIMENTS

The present invention discloses use of a composition comprising components A, B, and C and water as an efficacy-enhancing agent for agrochemicals, wherein a mass ratio of component B to component C, component B/component C, is 5 or more and 100 or less.

The present invention discloses use of a composition comprising components A, B, and C and water as an insecticide, wherein a mass ratio of component B to component C, component B/component C, is 5 or more and 100 or less.

Embodiments of the present invention will be described below.

<1>

An efficacy-enhancing agent composition for agrochemicals, including water and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein a mass ratio of component B to component C, component B/component C, is 5 or more and 100 or less.

<2>

The efficacy-enhancing agent composition for agrochemicals according to <1>, wherein a 2% viscosity of component A is preferably 50 mPa·s or more, more preferably 100 mPa·s or more, further preferably 400 mPa·s or more, furthermore preferably 2000 mPa·s or more, furthermore preferably 3000 mPa·s or more, furthermore preferably 4000 mPa·s or more, furthermore preferably 7000 mPa·s or more, and furthermore preferably 8000 mPa·s or more, and preferably 40000 mPa·s or less, preferably 38000 mPa·s or less, more preferably 35000 mPa·s or less, further preferably 30000 mPa·s or less, and furthermore preferably 20000 mPa·s or less.

<3>

The efficacy-enhancing agent composition for agrochemicals according to <1> or <2>, wherein a degree of substitution with methoxyl groups of hydroxypropylmethylcellulose is preferably 1.4 or more and more preferably 1.7 or more, and preferably 2.0 or less and more preferably 1.9 or less.

<4>

The efficacy-enhancing agent composition for agrochemicals according to any one of <1> to <3>, wherein component A is hydroxypropylmethylcellulose.

<5>

The efficacy-enhancing agent composition for agrochemicals according to any one of <1> to <4>, wherein the composition contains hydroxypropylmethylcellulose as component A.

<6>

The efficacy-enhancing agent composition for agrochemicals according to any one of <1> to <5>, wherein component A is hydroxypropylmethylcellulose providing a 2% viscosity of 50 mPa·s or more, further 400 mPa·s or more, and further 2000 mPa·s or more, further 3000 mPa·s or more, further 4000 mPa·s or more, further 5000 mPa·s or more, and further 10000 mPa·s or more, and 40000 mPa·s or less, further 38000 mPa·s or less, further 35000 mPa·s or less, further 33000 mPa·s or less, and further 30000 mPa·s or less.

<7>

The efficacy-enhancing agent composition for agrochemicals according to any one of <1> to <6>, wherein the sulfate, the phosphate, and the nitrate as component B are each an inorganic compound.

<8>

The efficacy-enhancing agent composition for agrochemicals according to any one of <1> to <7>, wherein component B is one or more compounds selected from ammonium sulfate, dipotassium hydrogen phosphate, sodium nitrate, glucose, sucrose, fructose, sorbitol, and glycerin, more preferably one or more compounds selected from ammonium sulfate, dipotassium hydrogen phosphate, sodium nitrate, and glucose, and further preferably ammonium sulfate.

<9>

The efficacy-enhancing agent composition for agrochemicals according to any one of <1> to <8>, wherein the number of carbon atoms of the alkyl group of the alkylbenzene sulfonate as component C is preferably 12 or more and 14 or less.

<10>

The efficacy-enhancing agent composition for agrochemicals according to any one of <1> to <9>, wherein the alkylbenzene sulfonate as component C is an alkali metal salt, preferably a sodium salt or a potassium salt, and more preferably a sodium salt.

<11>

The efficacy-enhancing agent composition for agrochemicals according to any one of <1> to <10>, wherein the number of carbon atoms of the alkyl group of the alkyldimethylamine oxide as component C is preferably 12 or more and 14 or less.

<12>

The efficacy-enhancing agent composition for agrochemicals according to any one of <1> to <10>, wherein component C is one or more surfactants selected from alkylbenzene sulfonates having an alkyl group with 12 or more and 16 or less carbon atoms.

<13>

The efficacy-enhancing agent composition for agrochemicals according to any one of <1> to <12>, wherein the composition contains component A in an amount of preferably 10 mass % or more, more preferably 12 mass % or more, and further preferably 15 mass % or more, and preferably 30 mass % or less, more preferably 27 mass % or less, and further preferably 25 mass % or less.

<14>

The efficacy-enhancing agent composition for agrochemicals according to any one of <1> to <13>, wherein the composition contains component B in an amount of preferably 20 mass % or more, more preferably 25 mass % or more, and further preferably 28 mass % or more, and preferably 50 mass % or less, more preferably 45 mass % or less, and further preferably 35 mass % or less.

<15>

The efficacy-enhancing agent composition for agrochemicals according to any one of <1> to <14>, wherein the composition contains component C in an amount of preferably 0.3 mass % or more, more preferably 0.5 mass % or more, and further preferably 0.8 mass % or more, and preferably 5.0 mass % or less, more preferably 4.0 mass % or less, and further preferably 3.0 mass % or less.

<16>

The efficacy-enhancing agent composition for agrochemicals according to any one of <1> to <15>, wherein the composition contains water in an amount of preferably 30 mass % or more, more preferably 40 mass % or more, and further preferably 45 mass % or more, and preferably 70 mass % or less, more preferably 60 mass % or less, and further preferably 55 mass % or less.

<17>

The efficacy-enhancing agent composition for agrochemicals according to any one of <1> to <16>, wherein the mass ratio of component A to component B, component A/component B, is preferably 0.2 or more, more preferably 0.3 or more, and further preferably 0.5 or more, and preferably 1.5 or less, more preferably 1.2 or less, and further preferably 0.8 or less.

<18>

The efficacy-enhancing agent composition for agrochemicals according to any one of <1> to <17>, wherein the mass ratio of component A to component C, component A/component C, is preferably 2 or more, more preferably 4 or more, and further preferably 10 or more, and 100 or less, more preferably 60 or less, and further preferably 30 or less.

<19>
The efficacy-enhancing agent composition for agrochemicals according to any one of <1> to <18>, wherein the mass ratio of component B to component C, component B/component C, is 5 or more, preferably 7 or more, and more preferably 15 or more, and 100 or less, preferably 50 or less, and more preferably 35 or less.

<20>
The efficacy-enhancing agent composition for agrochemicals according to any one of <1> to <19>, wherein the proportion of the total amount of components A, B, and C to the total amount of components other than water in the composition is preferably 70 mass % or more, more preferably 80 mass % or more, and further preferably 90 mass % or more, and is 100 mass % or less, or 100 mass %.

<21>
The efficacy-enhancing agent composition for agrochemicals according to any one of <1> to <20>, wherein the proportion of the amount of component C to the total amount of surfactants is preferably 70 mass % or more, more preferably 80 mass % or more, and further preferably 90 mass % or more, and is 100 mass % or less, or 100 mass %.

<22>
The efficacy-enhancing agent composition for agrochemicals according to any one of <1> to <21>, wherein the composition is a liquid.

<23>
The efficacy-enhancing agent composition for agrochemicals according to any one of <1> to <22>, wherein the composition has a viscosity at 20° C. of preferably 1 mPa·s or more, more preferably 5 mPa·s or more, and further preferably 10 mPa·s or more, and preferably 5000 mPa·s or less, more preferably 2500 mPa·s or less, and further preferably 1000 mPa·s or less, as measured with a type-B viscometer.

<24>
The efficacy-enhancing agent composition for agrochemicals according to any one of <1> to <23>, wherein the composition is a dispersion, further an aqueous dispersion, further a dispersion having component A dispersed in water.

<25>
A method for producing an efficacy-enhancing agent composition for agrochemicals, which includes mixing water and the following components A, B and C:
<component A> one or more cellulose derivatives selected from hydroxypropylcellulose and hydroxypropylmethylcellulose,
<component B> one or more compounds selected from a sulfate, a phosphate, a nitrate, sucrose, glucose, fructose, sorbitol, and glycerin, and
<component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms,
wherein components B and C are used such that a mass ratio of component B to component C, component B/component C, is 5 or more and 100 or less.

<26>
A method for producing an efficacy-enhancing agent composition for agrochemicals, which includes mixing water and the following components A, B and C:
<component A> one or more cellulose derivatives selected from hydroxypropylcellulose and hydroxypropylmethylcellulose,
<component B> one or more compounds selected from a sulfate, a phosphate, a nitrate, sucrose, glucose, fructose, sorbitol, and glycerin, and
<component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms,
wherein components B and C are used such that a mass ratio of component B to component C, component B/component C, is 5 or more and 100 or less, and
component A is mixed after mixing components B and C and water.

<27>
The method for producing an efficacy-enhancing agent composition for agrochemicals according to <25> or <26>, wherein the efficacy-enhancing agent composition for agrochemicals is produced as a dispersion.

<28>
An agrochemical composition including the efficacy-enhancing agent composition for agrochemicals according to any one of <1> to <24> and an agrochemical active ingredient.

<29>
The agrochemical composition according to <28>, wherein the agrochemical active ingredient is an active ingredient of any one of agrochemical selected from bactericides, insecticides, miticides, and herbicides.

<30>
The agrochemical composition according to <28> or <29>, wherein the mass ratio of the agrochemical active ingredient to component A, agrochemical active ingredient/component A, is preferably 0.2 or more, more preferably 0.5 or more, and further preferably 1 or more, and preferably 80 or less, more preferably 50 or less, and further preferably 20 or less.

<31>
The agrochemical composition according to any one of <28> to <30>, wherein the concentration of the agrochemical active ingredient formulated in the agrochemical composition is preferably 10 ppm or more, more preferably 100 ppm or more, and further preferably 250 ppm or more, and preferably 20000 ppm or less, more preferably 5000 ppm or less, and further preferably 3000 ppm or less.

<32>
The agrochemical composition according to any one of <28> to <31>, wherein the concentration of the efficacy-enhancing agent composition for agrochemicals formulated in the agrochemical composition is preferably 100 ppm or more, more preferably 500 ppm or more, and further preferably 800 ppm or more, and preferably 10000 ppm or less, more preferably 5000 ppm or less, and further preferably 2000 ppm or less.

<33>
The agrochemical composition according to any one of <28> to <32>, wherein the concentration of component A formulated in the agrochemical composition is preferably 10 ppm or more, more preferably 60 ppm or more, and further preferably 120 ppm or more, and preferably 3000 ppm or less, more preferably 1350 ppm or less, and further preferably 500 ppm or less.

<34>
The agrochemical composition according to any one of <28> to <33>, wherein the concentration of component B formulated in the agrochemical composition is preferably 20 ppm or more, more preferably 125 ppm or more, and further preferably 224 ppm or more, and preferably 5000 ppm or less, more preferably 2250 ppm or less, and further preferably 700 ppm or less.

<35>

The agrochemical composition according to any one of <28> to <34>, wherein the concentration of component C in the agrochemical composition is preferably 0.3 ppm or more, more preferably 2.5 ppm or more, and further preferably 6.4 ppm or more, and preferably 500 ppm or less, more preferably 200 ppm or less, and further preferably 60 ppm or less.

<36>

A method for enhancing the efficacy of an agrochemical, including applying to an object an agrochemical active ingredient, for example, an agrochemical active ingredient selected from bactericides, insecticides, miticides, and herbicides, with the efficacy-enhancing agent composition for agrochemicals of the present invention.

<37>

A method for improving rainfastness of an agrochemical, including applying to an object an agrochemical active ingredient, for example, an agrochemical active ingredient selected from bactericides, insecticides, miticides, and herbicides, with the efficacy-enhancing agent composition for agrochemicals of the present invention.

<38>

A method for improving the sticking properties of an agrochemical, including applying to an object an agrochemical active ingredient, for example, an agrochemical active ingredient selected from bactericides, insecticides, miticides, and herbicides, with the efficacy-enhancing agent composition for agrochemicals of the present invention.

<39>

A method for producing an agrochemical composition, which includes mixing an agrochemical active ingredient, water, and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein components B and C are used such that a mass ratio of component B to component C, component B/component C, is 5 or more and 100 or less.

<40>

The method for producing an agrochemical composition according to <39>, which includes steps of (1) mixing water and components B and C in a mass ratio, component B/component C, of 5 or more and 100 or less, followed by mixing component A therewith to obtain a mixture; and (2) mixing the mixture and the agrochemical active ingredient.

<41>

The method for producing an agrochemical composition according to <40>, wherein in step (1) the mixture is obtained in the form of a dispersion.

<42>

An insecticide composition including water and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein a mass ratio of component B to component C, component B/component C, is 5 or more and 100 or less.

<43>

The insecticide composition according to <42>, wherein a 2% viscosity of component A is preferably 50 mPa·s or more, more preferably 100 mPa·s or more, further preferably 400 mPa·s or more, furthermore preferably 2000 mPa·s or more, furthermore preferably 3000 mPa·s or more, furthermore preferably 4000 mPa·s or more, furthermore preferably 7000 mPa·s or more, and furthermore preferably 8000 mPa·s or more, and preferably 40000 mPa·s or less, preferably 38000 mPa·s or less, more preferably 35000 mPa·s or less, further preferably 30000 mPa·s or less, and furthermore preferably 20000 mPa·s or less.

<44>

The insecticide composition according to <42> or <43>, wherein the degree of substitution with methoxyl groups of hydroxypropylmethylcellulose is preferably 1.4 or more and more preferably 1.7 or more, and preferably 2.0 or less and more preferably 1.9 or less.

<45>

The insecticide composition according to any one of <42> to <45>, wherein component A is hydroxypropylmethylcellulose.

<46>

The insecticide composition according to any one of <42> to <45>, wherein the composition contains hydroxypropylmethylcellulose as component A.

<47>

The insecticide composition according to any one of <42> to <46>, wherein component A is hydroxypropylmethylcellulose providing a 2% viscosity of 50 mPa·s or more, further 400 mPa·s or more, and further 2000 mPa·s or more, further 3000 mPa·s or more, further 4000 mPa·s or more, further 5000 mPa·s or more, and further 10000 mPa·s or more, and 40000 mPa·s or less, further 38000 mPa·s or less, further 35000 mPa·s or less, further 33000 mPa·s or less, and further 30000 mPa·s or less.

<48>

The insecticide composition according to any one of <42> to <47>, wherein the sulfate, the phosphate, and the nitrate as component B are each an inorganic compound.

<49>

The insecticide composition according to any one of <42> to <48>, wherein component B is one or more compounds selected from ammonium sulfate, dipotassium hydrogen phosphate, sodium nitrate, glucose, sucrose, fructose, sorbitol, and glycerin, more preferably one or more compounds selected from ammonium sulfate, dipotassium hydrogen phosphate, sodium nitrate, and glucose, and further preferably ammonium sulfate.

<50>

The insecticide composition according to any one of <42> to <49>, wherein the number of carbon atoms of the alkyl group of the alkylbenzene sulfonate as component C is preferably 12 or more and 14 or less.

<51>

The insecticide composition according to any one of <42> to <50>, wherein the alkylbenzene sulfonate as component C is an alkali metal salt, preferably a sodium salt or a potassium salt, and more preferably a sodium salt.

<52>

The insecticide composition according to any one of <42> to <51>, wherein the number of carbon atoms of the alkyl group of the alkyldimethylamine oxide as component C is preferably 12 or more and 14 or less.

<53>

The insecticide composition according to any one of <42> to <52>, wherein component C is one or more surfactants selected from alkylbenzene sulfonates having an alkyl group with 12 or more and 16 or less carbon atoms.

<54>

The insecticide composition according to any one of <42> to <53>, wherein the composition contains component A in an amount of preferably 10 mass % or more, more preferably 12 mass % or more, and further preferably 15 mass % or more, and preferably 30 mass % or less, more preferably 27 mass % or less, and further preferably 25 mass % or less.

<55>

The insecticide composition according to any one of <42> to <54>, wherein the composition contains component B in an amount of preferably 20 mass % or more, more preferably 25 mass % or more, and further preferably 28 mass % or more, and preferably 50 mass % or less, more preferably 45 mass % or less, and further preferably 35 mass % or less.

<56>

The insecticide composition according to any one of <42> to <55>, wherein the composition contains component C in an amount of preferably 0.3 mass % or more, more preferably 0.5 mass % or more, and further preferably 0.8 mass % or more, and preferably 5.0 mass % or less, more preferably 4.0 mass % or less, and further preferably 3.0 mass % or less.

<57>

The insecticide composition according to any one of <42> to <56>, wherein the composition contains water in an amount of preferably 30 mass % or more, more preferably 40 mass % or more, and further preferably 45 mass % or more, and preferably 70 mass % or less, more preferably 60 mass % or less, and further preferably 55 mass % or less.

<58>

The insecticide composition according to any one of <42> to <57>, wherein the mass ratio of component A to component B, component A/component B, is preferably 0.2 or more, more preferably 0.3 or more, and further preferably 0.5 or more, and preferably 1.5 or less, more preferably 1.2 or less, and further preferably 0.8 or less.

<59>

The insecticide composition according to any one of <42> to <58>, wherein the mass ratio of component A to component C, component A/component C, is preferably 2 or more, more preferably 4 or more, and further preferably 10 or more, and 100 or less, more preferably 60 or less, and further preferably 30 or less.

<60>

The insecticide composition according to any one of <42> to <59>, wherein the mass ratio of component B to component C, component B/component C, is 5 or more, preferably 7 or more, and more preferably 15 or more, and 100 or less, preferably 50 or less, and more preferably 35 or less.

<61>

The insecticide composition according to any one of <42> to <60>, wherein the proportion of the total amount of components A, B, and C to the total amount of components other than water in the composition is preferably 70 mass % or more, more preferably 80 mass % or more, and further preferably 90 mass % or more, and is 100 mass % or less, or 100 mass %.

<62>

The insecticide composition according to any one of <42> to <61>, wherein the proportion of the amount of component C to the total amount of surfactants is preferably 70 mass % or more, more preferably 80 mass % or more, and further preferably 90 mass % or more, and is 100 mass % or less, or 100 mass %.

<63>

The insecticide composition according to any one of <42> to <62>, wherein the composition is a liquid.

<64>

The insecticide composition according to any one of <42> to <63>, wherein the composition has a viscosity at 20° C. of preferably 1 mPa·s or more, more preferably 5 mPa·s or more, and further preferably 10 mPa·s or more, and preferably 5000 mPa·s or less, more preferably 2500 mPa·s or less, and further preferably 1000 mPa·s or less, as measured with a type-B viscometer.

<65>

The insecticide composition according to any one of <42> to <64>, wherein the composition is a dispersion, further preferably an aqueous dispersion, further preferably a dispersion having component A dispersed in water.

<66>

A method for producing an insecticide composition, which includes mixing water and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein components B and C are used such that a mass ratio of component B to component C, component B/component C, is 5 or more and 100 or less.

<67>

A method for producing an insecticide composition, which includes mixing water and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein components B and C are used such that a mass ratio of component B to component C, component B/component C, is 5 or more and 100 or less, and component A is mixed after mixing components B and C and water.

<68>

The method for producing an insecticide composition according to <66> or <67>, wherein the insecticide composition is produced as a dispersion.

<69>

Use of a composition as an efficacy-enhancing agent for agrochemicals, the composition including water and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein a mass ratio of component B to component C, component B/component C, is 5 or more and 100 or less.

<70>

Use of a composition as an insecticide, the composition including water and the following components A, B and C:

<component A> one or more cellulose derivatives selected from hydroxypropylcellulose and hydroxypropylmethylcellulose, <component B> one or more compounds selected from a sulfate, a phosphate, a nitrate, sucrose, glucose, fructose, sorbitol, and glycerin, and <component C> one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein a mass ratio of component B to component C, component B/component C, is 5 or more and 100 or less.

EXAMPLES

Example 1

(1) Preparation of Liquid Efficacy-Enhancing Agent Composition for Agrochemicals Liquid efficacy-enhancing agent compositions for agrochemicals shown in Table 4 each were prepared using components shown in Tables 1 to 3.

According to the ratio shown in Table 4, a prescribed amount of water was placed in a 200-mL glass beaker at 20° C. While stirring at a rotational speed of 200 rpm, component B was added thereto, and the resultant was stirred for 30 minutes to dissolve component B. Then, component C was added thereto, and the resultant was stirred for 30 minutes to dissolve component C. Further, component A was added thereto, and the resultant was stirred for 1 hour. Thus, 100 g of each of the compositions was prepared.

In Table 4, components which do not correspond to any of components A, B, and C are also shown in a column of any of components A, B, and C for convenience.

All of the liquid efficacy-enhancing agent compositions for agrochemicals of Examples shown in Table 4 had a viscosity of 300 mPa·s or less at 20° C. All of the compositions of Examples were dispersions. All of the compositions of Examples were found to be in a good dispersed state by visual observation on appearance. FIG. 1 shows a photograph of the state of Example 1-3 (viscosity 70 mPa·s, good dispersed state) and that of Comparative Example 1-1 (viscosity 10000 mPa·s or more (gelling state); crystals were dissolved not to disperse). As clear from photographs, it can be seen that the composition of Example 1-3 can be easily taken out uniformly, and that the composition of Comparative Example 1-1 has no flowability and thus cannot be taken out easily.

(2) Evaluation (2-1) Test for Storage Stability of Liquid Efficacy-Enhancing Agent Composition for Agrochemicals 100 mL of a liquid efficacy-enhancing agent composition for agrochemicals was placed in a 100-mL glass bottle, and left to stand at 50° C. with the glass bottle sealed. The duration of leaving to stand was 90 days.

The appearance of the liquid efficacy-enhancing agent composition for agrochemicals was visually observed to see whether the composition solidified or separated. Days taken for the composition to solidify or separated were counted, and the results are shown in Table 4. A case where the composition solidified or separated immediately after the preparation is indicated by "0 days," and a case where the composition did not solidify or separate during the duration of leaving to stand is indicated by "90 days." In this evaluation, the number of days taken for the composition to solidify or separate is preferably 20 days or more. The more the number of days is, the more preferable it is.

As a result, the liquid efficacy-enhancing agent compositions for agrochemicals of Examples exhibited higher storage stability for long time than those of Comparative Examples because dispersibility of component A in water was improved in Examples.

(2-2) Test for Efficacy Enhancement of Agrochemicals

As for the composition which maintained storage stability for 30 days or more in the test of (2-1), the composition was sampled on day 30 of the test for storage stability, and the sample was subjected to the evaluation of the effects of enhancing the efficacy of agrochemicals according to the following methods.

(2-2-1) Effect of Enhancing Herbicidal Properties

Plants of Barnyard grass were grown in 12-cm pots, and resulting plant bodies having a plant height of about 30 cm were subjected to the test. 4.8 g of a Roundup liquid concentrate (active ingredient of herbicide: 41 mass % in terms of glyphosate isopropylamine salt, commercial product, manufactured by NISSAN CHEMICAL INDUSTRY, LTD.), 1 g of a liquid efficacy-enhancing agent compositions for agrochemicals shown in Table 4, and water were mixed, and the resulting mixture was diluted in a measuring cylinder to 1 L to obtain an agrochemical composition having a concentration of glyphosate isopropylamine salt of 1968 ppm and a concentration of the liquid efficacy-enhancing agent compositions for agrochemicals of 1000 ppm. These concentrations were concentrations where use of the agrochemical composition by spraying was assumed, and the liquid efficacy-enhancing agent compositions for agrochemicals underwent 1000-fold dilution. Then the plants were placed in a density of 5 pots per 1 m², and the agrochemical composition was applied as a foliar spray so as to fall onto the whole of the plants in an amount sprayed of 100 L/10 a. For evaluation of the herbicidal effect, the fresh mass of the above-ground part was weighed on day 14 after the spraying, and the herbicidal rate was calculated from the following expression on the basis of the fresh mass of the above-ground part in the non-treated area. A higher value of the herbicidal rate means that the efficacy of the agrochemical (the herbicidal effect) was more enhanced.

Herbicidal rate (%)=(1−(Fresh mass of above-ground part in treated area/Fresh mass of above-ground part in non-treated area))×100

It can be seen from the results in Table 4 that the agrochemical composition of the present invention can exhibit an improved herbicidal effect.

(2-2-2) Effect of Enhancing Insecticidal Properties

Cabbage was raised in a 12-cm pot to about the 6-leaf stage. Cabbage leaves having a diameter of about 5 cm were picked separately and subjected to the test. 1 g of an Ortran wettable powder as an insecticide (active ingredient of insecticide: 50 mass % in terms of acephate, commercial product, HOKKO CHEMICAL INDUSTRY CO., LTD.), 1 g of a liquid efficacy-enhancing agent composition for agrochemicals shown in Table 4, and water were mixed, and the resulting mixture was diluted in a measuring cylinder to 1 L to obtain an agrochemical composition having a concentration of the Ortran wettable powder of 1000 ppm (500 ppm in terms of acephate, which is the active ingredient of the agrochemical active ingredient) and a concentration of the liquid efficacy-enhancing agent compositions for agrochemicals of 1000 ppm. Thirty cotton aphids commercially available (manufactured by Sumika Technoservice Corporation) were put on one cabbage leaf, and the agrochemical composition was applied as a foliar spray in an amount sprayed of 2 mL/leaf. Three repetitions were made. The cabbage leaf was placed on a wet filter paper in a petri dish, and the petri dish was sealed and fixed with tape to prevent cotton aphids from running away, followed by leaving to stand at 23° C. After one day, living insects were counted, and the insecticidal rate was calculated from the following expression.

Insecticidal rate (%)=(1−(Number of living insects in treated area/Number of living insects in non-treated area))×100

It can be seen from the results in Table 4 that the agrochemical composition of the present invention can exhibit an improved insecticidal effect.

(2-2-3) Effect of Enhancing Bactericidal Properties

Cucumber plants were each raised in a 12-cm pot to about the 4-leaf stage. The cucumber plants were placed in a density of 5 pots per 1 m², and a spore suspension of *Botrytis Cinerea* (plate count: $10^7$/ml) was sprayed on the cucumber plants in an amount sprayed of 50 L/10 a. Then, the pots were left to stand at a temperature of 25° C. and a relative humidity of 90%, and the plants were infected with the bacteria. 0.5 g of a Benlate wettable powder (active ingredient of bactericide: 50 mass % in terms of benomyl, commercial product, manufactured by Sumitomo Chemical Co., Ltd.), 1 g of a liquid efficacy-enhancing agent compositions for agrochemicals shown in Table 4, and water were mixed, and the resulting mixture was diluted in a measuring cylinder to 1 L to obtain an agrochemical composition having a concentration of the Benlate wettable powder of 500 ppm (250 ppm in terms of benomyl, which is the active ingredient of the agrochemical) and a concentration of the liquid efficacy-enhancing agent compositions for agrochemicals of 1000 ppm. Three days after the plants were infected with the bacteria, the agrochemical composition was applied as a foliar spray on the cucumber plants in an amount sprayed of 100 L/10 a. The pots were left to stand at a temperature of 25° C. and a relative humidity of 85% for 1 week. Then, number of spots were counted, and the preventive value was calculated from the following expression. The higher the preventive value is, the higher the efficacy of the agrochemical (bactericidal effect) is.

Preventive value (%)=(1−(Number of spots in treated area/Number of spots in non-treated area))×100

It can be seen from the results in Table 4 that the agrochemical composition of the present invention can exhibit an improved bactericidal effect.

(2-3) Test for Agrochemical Activity

As for the composition which maintained storage stability at 50° C. for 30 days or more in the test of (2-1), the composition was sampled at day 30 of the test for stability and the sample was subjected to the evaluation for insecticidal properties according to the following method.

The liquid efficacy-enhancing agent compositions for agrochemicals shown in Table 4 were each used as a liquid insecticide agent composition. 2 g thereof and water were mixed, and the resulting mixture was diluted in a measuring cylinder to 1 L to obtain a dilution of the liquid insecticide agent composition. This dilution was a 500-fold dilution of the liquid insecticide agent composition. This dilution includes no other agrochemical active ingredient. The dilution of the liquid insecticide agent composition was used as an agrochemical composition and evaluated for the insecticidal properties in the same manner as in (2-2-2).

It can be seen from the results in Table 4 that the insecticide agent composition of the present invention can exhibit a bactericidal effect even though it does not include any other agrochemical active ingredients that have safety problems for the environment or human and bring about agrochemical resistance of insects.

TABLE 1

| Reference Sign | Compound Name | Product Name | Content of Active Ingredient (mass %) | 2% Viscosity*1 (mPa · s) | Degree of Substitution*2 | Manufacturer |
|---|---|---|---|---|---|---|
| A-1 | Hydroxypropylcellulose | HPC-H | 100 | 4000 | 3.3 | NIPPON SODA CO., LTD. |
| A-2 | Hydroxypropylmethylcellulose | Metolose 65SH-4000 | 100 | 4000 | 1.8 | Shin-Etsu Chemical Co., Ltd. |
| A-3 | Hydroxypropylmethylcellulose | Metolose 60SH-10000 | 100 | 10000 | 1.9 | Shin-Etsu Chemical Co., Ltd. |
| A-4 | Hydroxypropylmethylcellulose | Metolose 65SH-15000 | 100 | 15000 | 1.8 | Shin-Etsu Chemical Co., Ltd. |
| A'-1 | Carboxymethylcellulose | CMC 1180 | 100 | 6000 | — | Daicel Corporation |

*1 2% viscosity: it is the viscosity of a 2 mass % aqueous solution at 20° C.

*2 degree of substitution: it is the degree of substitution with hydroxypropoxyl groups for hydroxypropylcellulose or the degree of substitution with methoxyl groups for hydroxypropylmethylcellulose.

TABLE 2

| Reference Sign | Compound Name | Content of Active Ingredient (mass %) | Manufacturer |
|---|---|---|---|
| B-1 | Ammonium Sulfate | 100 | Wako Pure Chemical Industries, Ltd. |
| B-2 | Dipotassium Hydrogen Phosphate | 100 | Wako Pure Chemical Industries, Ltd. |
| B-3 | Sodium Nitrate | 100 | Wako Pure Chemical Industries, Ltd. |
| B-4 | Glucose | 100 | Wako Pure Chemical Industries, Ltd. |
| B-5 | Fructose | 100 | Wako Pure Chemical Industries, Ltd. |
| B-6 | Sucrose | 100 | Wako Pure Chemical Industries, Ltd. |
| B-7 | Sorbitol (Product Name: Kao Sorbitol) | 70 | Kao Corporation |
| B-8 | Glycerin | 100 | Wako Pure Chemical Industries, Ltd. |
| B'-1 | Sodium Carbonate | 100 | Wako Pure Chemical Industries, Ltd. |
| B'-2 | Maltose | 100 | Wako Pure Chemical Industries, Ltd. |

TABLE 3

| Reference Sign | Compound Name | Number of Carbon Atoms of Alkyl Group | Product Name | Content of Active Ingredient (mass %) | Manufacturer |
|---|---|---|---|---|---|
| C-1 | Sodium Dodecylbenzenesulfonate | 12 | NEOPELEX No. 6F Powder | 60 | Kao Corporation |
| C-2 | Lauryl Dimethylamine Oxide | 12 | AMPHITOL 20N | 35 | Kao Corporation |
| C'-1 | Polyoxyethylene Lauryl Ether (Average Number of Moles of Added Ethylene Oxide: 6) | 12 | EMULGEN 108 | 100 | Kao Corporation |

TABLE 4

| | | Liquid Efficacy-Enhancing Agent Composition for Agrochemicals | | | | | | | | | |
|---|---|---|---|---|---|---|---|---|---|---|---|
| | | Kind | | | Mass %*1 | | | | | Mass Ratio*2 | |
| | | Component A | Component B | Component C | Component A | Component B | Component C | Water | A/B | A/C | B/C |
| Examples | 1-1 | A-1 | B-1 | C-1 | 20 | 30 | 2 (1.2) | 48 | 0.87 | 16.67 | 25.00 |
| | 1-2 | A-2 | B-1 | C-1 | 20 | 30 | 2 (1.2) | 48 | 0.87 | 16.67 | 25.00 |
| | 1-3 | A-3 | B-1 | C-1 | 20 | 30 | 2 (1.2) | 48 | 0.87 | 16.67 | 25.00 |
| | 1-4 | A-4 | B-1 | C-1 | 20 | 30 | 2 (1.2) | 48 | 0.57 | 16.67 | 25.00 |
| | 1-5 | A-3 | B-2 | C-1 | 20 | 30 | 2 (1.2) | 48 | 0.57 | 16.67 | 25.00 |
| | 1-6 | A-3 | B-3 | C-1 | 20 | 30 | 2 (1.2) | 48 | 0.57 | 16.67 | 25.00 |
| | 1-7 | A-3 | B-4 | C-1 | 20 | 40 | 2 (1.2) | 38 | 0.50 | 16.67 | 33.33 |
| | 1-8 | A-3 | B-5 | C-1 | 20 | 40 | 2 (1.2) | 38 | 0.50 | 16.67 | 33.33 |
| | 1-9 | A-3 | B-6 | C-1 | 20 | 40 | 2 (1.2) | 38 | 0.50 | 16.67 | 33.33 |
| | 1-10 | A-3 | B-7 | C-1 | 20 | 60 (42) | 2 (1.2) | 18 | 0.46 | 16.67 | 35.00 |
| | 1-11 | A-3 | B-8 | C-1 | 20 | 35 | 2 (1.2) | 43 | 0.57 | 16.67 | 29.17 |
| | 1-12 | A-3 | B-1 | C-2 | 20 | 30 | 3 (1.05) | 47 | 0.57 | 19.05 | 28.57 |
| | 1-13 | A-3 | B-1 | C-1 | 30 | 20 | 2 (1.2) | 48 | 1.50 | 25.00 | 18.87 |
| | 1-14 | A-3 | B-1 | C-1 | 10 | 35 | 2 (1.2) | 53 | 0.29 | 6.33 | 29.17 |
| | 1-15 | A-3 | B-1 | C-1 | 30 | 30 | 0.5 (0.3) | 39.5 | 1.00 | 100.00 | 100.00 |
| | 1-16 | A-3 | B-1 | C-1 | 10 | 30 | 8 (4.8) | 52 | 0.33 | 2.08 | 6.25 |
| | 1-17 | A-3 | B-1 | C-1 | 30 | 30 | 2 (1.2) | 38 | 1.00 | 25.00 | 25.00 |
| | 1-18 | A-3 | B-1 | C-1 | 10 | 30 | 2 (1.2) | 58 | 0.33 | 0.33 | 25.00 |
| | 1-19 | A-3 | B-1 | C-1 | 20 | 35 | 2 (1.2) | 43 | 0.57 | 16.67 | 29.17 |
| | 1-20 | A-3 | B-1 | C-1 | 20 | 20 | 2 (1.2) | 58 | 1.00 | 16.67 | 18.37 |
| | 1-21 | A-3 | B-1 | C-1 | 20 | 30 | 8 (4.8) | 42 | 0.67 | 4.16 | 6.25 |
| | 1-22 | A-3 | B-1 | C-1 | 20 | 30 | 0.5 (0.3) | 49.5 | 0.67 | 68.87 | 100.00 |
| Comparative Examples | 1-1 | A-3 | — | — | 20 | — | — | 58 | — | — | — |
| | 1-2 | A-3 | B-1 | — | 20 | 30 | — | 50 | 0.67 | — | — |
| | 1-3 | A-3 | — | C-1 | 20 | — | 2 (1.2) | 78 | — | 18.87 | 0.00 |
| | 1-4 | A-3 | — | C-1 | 20 | — | 2 | 78 | — | 10.00 | 0.00 |
| | 1-5 | A-3 | B-1 | C-1 | 20 | 30 | 2 | 48 | — | 10.00 | 0.00 |
| | 1-6 | A-3 | B'-1 | C-1 | 20 | 30 | 2 (1.2) | 48 | 0.67 | 18.87 | 25.00 |
| | 1-7 | A-3 | B'-2 | C-1 | 20 | 30 | 2 (1.2) | 48 | 0.67 | 18.87 | 25.00 |
| | 1-8 | A'-1 | B-3 | C-1 | 20 | 30 | 2 (1.2) | 48 | 0.67 | 18.87 | 25.00 |
| | 1-9 | A-3 | B-1 | C-1 | 20 | 25 | 10.3 (6.2) | 44.7 | 0.80 | 3.23 | 4.0 |
| | 1-10 | A-3 | B-1 | C-1 | 20 | 31 | 0.33 (0.2) | 48.67 | 0.65 | 100 | 155 |

TABLE 4-continued

| | | Test for Storage Stability (days) | Test for Efficacy Enhancement of Agrochemicals | | | Test for Agrochemical Activity |
|---|---|---|---|---|---|---|
| Reference | | | Control (without Liquid Efficacy-Enhancing Agent Composition for Agrochemicals) | | | |
| | | | Herbicidal Rate (%) | Insecticidal Rate (%) | Preventive Value (%) | Insecticidal Value (%) |
| Examples | 1-1 | 90 | 82 | 84 | 76 | 53 |
| | 1-2 | 90 | 84 | 84 | 82 | 56 |
| | 1-3 | 90 | 88 | 90 | 84 | 60 |
| | 1-4 | 90 | 87 | 89 | 83 | 59 |
| | 1-5 | 51 | 86 | 88 | 81 | 54 |
| | 1-6 | 46 | 84 | 86 | 80 | 56 |
| | 1-7 | 44 | 84 | 84 | 78 | 54 |
| | 1-8 | 40 | 80 | 82 | 78 | 53 |
| | 1-9 | 40 | 81 | 82 | 78 | 53 |
| | 1-10 | 33 | 78 | 78 | 75 | 50 |
| | 1-11 | 31 | 76 | 76 | 72 | 48 |
| | 1-12 | 80 | 86 | 86 | 83 | 57 |
| | 1-13 | 30 | 78 | 80 | 71 | 46 |
| | 1-14 | 42 | 76 | 77 | 71 | 45 |
| | 1-15 | 30 | 79 | 77 | 74 | 51 |
| | 1-16 | 31 | 86 | 68 | 64 | 41 |
| | 1-17 | 33 | 86 | 89 | 83 | 58 |
| | 1-18 | 33 | 70 | 70 | 68 | 44 |
| | 1-19 | 46 | 82 | 83 | 79 | 53 |
| | 1-20 | 33 | 76 | 77 | 70 | 47 |
| | 1-21 | 46 | 80 | 78 | 74 | 52 |
| | 1-22 | 45 | 76 | 76 | 73 | 53 |
| Comparative Examples | 1-1 | 0 | Impossible to Test due to Separation and Solidification (Impossible to be Taken out Uniformly) | | | |
| | 1-2 | 0 | Impossible to Test due to Separation and Solidification (Impossible to be Taken out Uniformly) | | | |
| | 1-3 | 0 | Impossible to Test due to Separation and Solidification (Impossible to be Taken out Uniformly) | | | |
| | 1-4 | 0 | Impossible to Test due to Separation and Solidification (Impossible to be Taken out Uniformly) | | | |
| | 1-5 | 0 | Impossible to Test due to Separation and Solidification (Impossible to be Taken out Uniformly) | | | |
| | 1-6 | 0 | Impossible to Test due to Separation and Solidification (Impossible to be Taken out Uniformly) | | | |
| | 1-7 | 0 | Impossible to Test due to Separation and Solidification (Impossible to be Taken out Uniformly) | | | |
| | 1-8 | 7 | Impossible to Test due to Separation and Solidification (Impossible to be Taken out Uniformly) | | | |
| | 1-9 | 6 | Impossible to Test due to Separation and Solidification (Impossible to be Taken out Uniformly) | | | |
| | 1-10 | 12 | Impossible to Test due to Separation and Solidification (Impossible to be Taken out Uniformly) | | | |
| Reference | | Control (without Liquid Efficacy-Enhancing Agent Composition for Agrochemicals) | 45 | 54 | 20 | 0 |

*[1]mass %: it is mass % of each component as such, and when the component does not have an active ingredient content of 100 mass %, the amount in terms of the active ingredient is indicated in mass % in parentheses.
*[2]mass ratio: it is a mass ratio on the basis of the amount in mass % of each component in terms of active ingredient.

The invention claimed is:

1. An efficacy-enhancing agent composition for agrochemicals, comprising 30 mass % or more of water and the following components A, B and C:
   <component A> 10 mass % or more and 30 mass % or less of one or more cellulose derivatives selected from hydroxypropylcellulose and hydroxypropylmethylcellulose,
   <component B> 20 mass % or more and 50 mass % or less of one or more compounds selected from a sulfate, a phosphate, a nitrate, sucrose, glucose, fructose, sorbitol, and glycerin, and
   <component C> 0.3 mass % or more and 5.0 mass % or less of one or more surfactants selected from an alkylbenzene sulfonate having an alkyl group with 12 or more and 16 or less carbon atoms and an alkyldimethylamine oxide having an alkyl group with 12 or more and 16 or less carbon atoms,
   wherein the mass ratio of the component B to the component C, component B/component C, is 5 or more and 100 or less.

2. The efficacy-enhancing agent composition for agrochemicals according to claim 1, wherein the mass ratio of the component A to the component B, component A/component B, is 0.2 or more and 1.5 or less.

3. The efficacy-enhancing agent composition for agrochemicals according to claim 1, wherein the mass ratio of the component A to the component C, component A/component C, is 2 or more and 100 or less.

4. An agrochemical composition comprising the efficacy-enhancing agent composition for agrochemicals according to claim 1 and an agrochemical active ingredient.

5. A treatment liquid containing an insecticide composition, wherein the insecticide composition comprises water and the following components A, B and C:
   <component A> 10 mass % or more and 30 mass % or less of one or more cellulose derivatives selected from hydroxypropylcellulose and hydroxypropylmethylcellulose,
   <component B> 20 mass % or more and 50 mass % or less of one or more compounds selected from a sulfate, a phosphate, a nitrate, sucrose, glucose, fructose, sorbitol, and glycerin, and
   <component C> 0.3 mass % or more and 5.0 mass % or less of one or more surfactants selected from an alkylbenzene sulfonate having an alkyl group with 12 or more and 16 or less carbon atoms and an alkyldimethylamine oxide having an alkyl group with 12 or more and 16 or less carbon atoms, wherein the mass ratio of the component B to the component C, component B/component C, is 5 or more and 100 or less, wherein the concentration of the insecticide composition in the treatment liquid is 100 ppm or more and 10,000 ppm or less, and wherein the treatment liquid does not contain any other agrochemical ingredient of an insecticide.

6. A method for producing the efficacy-enhancing agent composition for agrochemicals of claim 1, the method comprising mixing water and components A, B and C, wherein the component A is mixed after mixing the components B and C and water.

7. The method for producing an efficacy-enhancing agent composition for agrochemicals according to claim 6, wherein the whole amount of the component A to be formulated into the efficacy-enhancing agent composition for agrochemicals is mixed after mixing the whole amount of the component B, the whole amount of the component C, and the whole amount of water to be formulated into the efficacy-enhancing agent composition for agrochemicals.

8. The method for producing an efficacy-enhancing agent composition for agrochemicals according to claim 6, wherein the component B is added to water, the component C is then added thereto, and the component A is then added thereto and mixed.

\* \* \* \* \*